United States Patent
Guzelgunler et al.

(10) Patent No.: US 9,880,526 B2
(45) Date of Patent: Jan. 30, 2018

(54) SYSTEM AND METHOD FOR AUTOMATING ANCILLARY DEVICES USING A MOTOR CONTROLLER FOR A PUMP

(71) Applicant: Regal Beloit America, Inc., Beloit, WI (US)

(72) Inventors: Yilcan Guzelgunler, Troy, OH (US); Jason Jon Kreidler, Sheboygan Falls, WI (US); Stephen D. O'Brien, Troy, OH (US)

(73) Assignee: Regal Beloit America, Inc., Beloit, WI (US)

( * ) Notice: Subject to any disclaimer, the term of this patent is extended or adjusted under 35 U.S.C. 154(b) by 233 days.

(21) Appl. No.: 14/272,010

(22) Filed: May 7, 2014

(65) Prior Publication Data
US 2015/0323911 A1  Nov. 12, 2015

(51) Int. Cl.
*H02P 3/00* (2006.01)
*G05B 11/32* (2006.01)
*H02P 1/02* (2006.01)

(52) U.S. Cl.
CPC ............... *G05B 11/32* (2013.01); *H02P 1/02* (2013.01)

(58) Field of Classification Search
CPC .................................. H02P 1/02; G05B 11/32
USPC ........................................................ 318/478
See application file for complete search history.

(56) References Cited

U.S. PATENT DOCUMENTS

| | | | |
|---|---|---|---|
| 6,756,998 B1 | 6/2004 | Bilger | |
| 6,909,921 B1 | 6/2005 | Bilger | |
| 7,821,215 B2 * | 10/2010 | Koehl | F04D 15/0088 318/280 |
| 8,042,048 B2 | 10/2011 | Wilson et al. | |
| 8,096,294 B1 * | 1/2012 | Jenkins | F24J 2/0461 126/624 |
| 8,145,357 B2 | 3/2012 | Nibler et al. | |
| 8,490,006 B1 | 7/2013 | Reeser et al. | |
| 8,504,921 B2 | 8/2013 | Wilson et al. | |
| 2003/0116105 A1 * | 6/2003 | Pfeffinger | F01P 3/20 123/41.31 |
| 2005/0127197 A1 | 6/2005 | Uy et al. | |
| 2010/0141194 A1 * | 6/2010 | Koehl | F04D 15/0088 318/434 |
| 2010/0312401 A1 * | 12/2010 | Gutierrez | E21B 33/068 700/282 |
| 2010/0321151 A1 | 12/2010 | Matsuura et al. | |
| 2011/0204832 A1 * | 8/2011 | Zavodny | H02P 23/0004 318/400.3 |

(Continued)

*Primary Examiner* — Eduardo Colon Santana
*Assistant Examiner* — Gabriel Agared
(74) *Attorney, Agent, or Firm* — Armstrong Teasdale LLP

(57) ABSTRACT

A motor controller coupled to a motor for a pump is described. The motor controller is configured to determine a first mode of operation for the motor, based on at least one of a predefined schedule stored by the motor controller and an input signal received by the motor controller from at least one ancillary device. The motor controller is additionally configured to transmit a first control signal to the motor to operate the motor in the first mode, and to transmit a second control signal to change an operation of the at least one ancillary device, wherein the at least one ancillary device includes one or more of a heater, a chlorine generator, and an ozone generator.

20 Claims, 7 Drawing Sheets

(56) References Cited

U.S. PATENT DOCUMENTS

| | | | |
|---|---|---|---|
| 2011/0274560 A1* | 11/2011 | Clark | F04B 49/065 |
| | | | 417/14 |
| 2012/0185571 A1 | 7/2012 | Uy | |
| 2012/0187882 A1* | 7/2012 | Zumstein | H02P 1/04 |
| | | | 318/484 |
| 2013/0090746 A1 | 4/2013 | Quail | |
| 2013/0152797 A1* | 6/2013 | Mori | A47J 31/3604 |
| | | | 99/280 |

* cited by examiner

SYSTEM AND METHOD FOR AUTOMATING ANCILLARY DEVICES USING A MOTOR CONTROLLER FOR A PUMP

BACKGROUND

The field of the disclosure relates generally to motor controllers, and more particularly, to systems and methods for automating one or more devices using a motor controller for a pump.

At least some known systems for moving fluid, such as a pumping system for a pool or spa, are part of a larger system that controls operations of additional devices (referred to herein as "ancillary devices"), such as a heater, a chlorine generator, an ozone generator, and/or other devices. In such systems, a device known as an automation controller transmits signals to a motor or motor controller for the pump, and to the ancillary devices, to coordinate pumping of the fluid, heating of the fluid, chlorination of the fluid, and/or other functions based on a predefined schedule or other settings. In such systems, the automation controller is a standalone device. In many known systems, the automation controller is capable of coordinating the functions of a variety of devices that do not pertain specifically to pumping the fluid. Accordingly, many automation controllers add complexity and costs that exceed the requirements of many consumers.

BRIEF DESCRIPTION

In one aspect, a motor controller coupled to a motor for a pump is provided. The motor controller is configured to determine a first mode of operation for the motor, based on at least one of a predefined schedule stored by the motor controller and an input signal received by the motor controller from at least one ancillary device. The motor controller is additionally configured to transmit a first control signal to the motor to operate the motor in the first mode, and to transmit a second control signal to change an operation of the at least one ancillary device, wherein the at least one ancillary device includes one or more of a heater, a chlorine generator, and an ozone generator.

In another aspect, a system is provided. The system includes a motor controller, a motor coupled to the motor controller, a pump coupled to the motor, and at least one ancillary device communicatively coupled to the motor controller. The at least one ancillary device includes at least one of a heater, a chlorine generator, and an ozone generator. The motor controller is configured to determine a first mode of operation for the motor, based on at least one of a predefined schedule stored by the motor controller and an input signal received by the motor controller from the at least one ancillary device, transmit a first control signal to the motor to operate the motor in the first mode, and transmit a second control signal to change an operation of the at least one ancillary device.

In another aspect, a method for automating operations of an ancillary device with a motor controller associated with a motor for a pump is provided. The method includes determining, by the motor controller, a first mode of operation for the motor, based on at least one of a predefined schedule stored by the motor controller and an input signal received by the motor controller from the at least one ancillary device. The method additionally includes transmitting, by the motor controller, a first control signal to the motor to operate the motor in the first mode and transmitting, by the motor controller, a second control signal to change an operation of the at least one ancillary device. The at least one ancillary device includes one or more of a heater, a chlorine generator, and an ozone generator.

DETAILED DESCRIPTION

Figure 1:
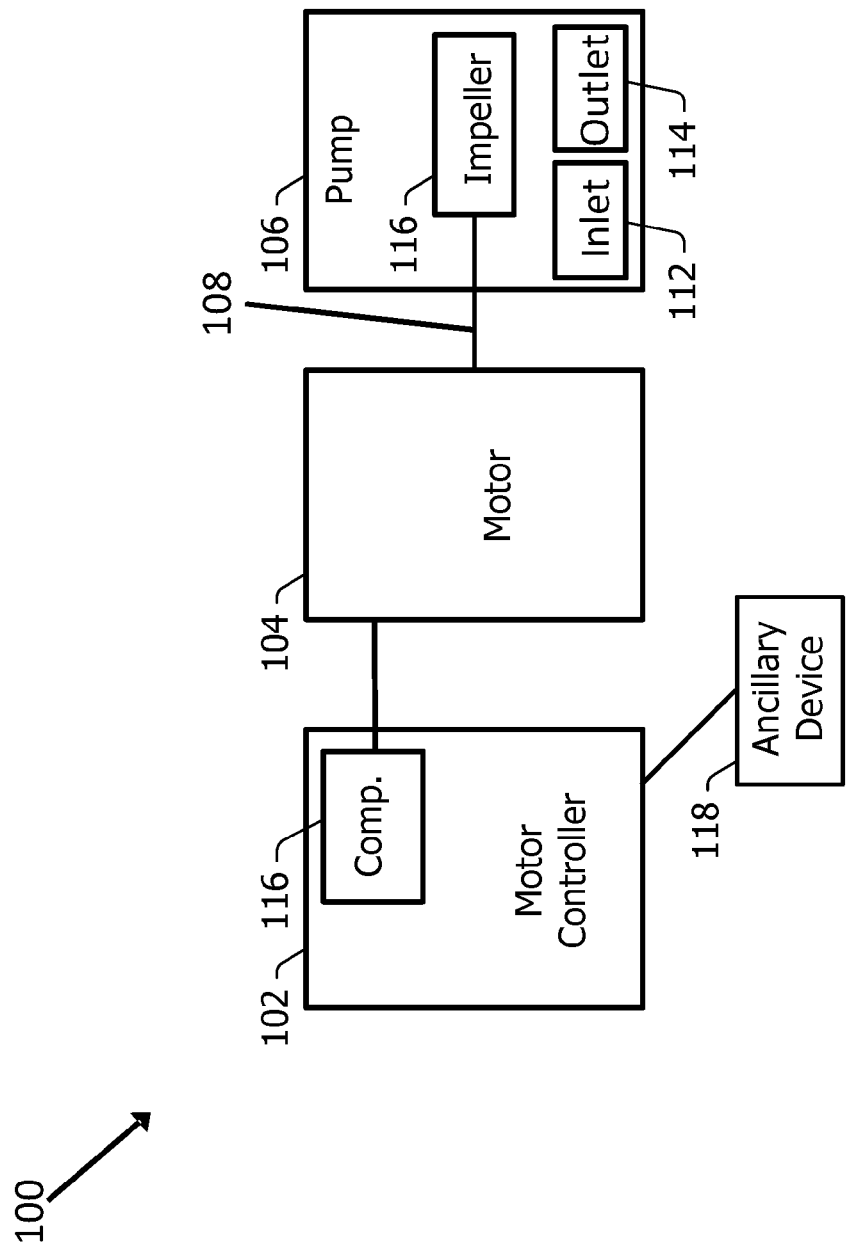
FIG. 1 is a block diagram of an example system that includes a motor controller coupled to a motor and to ancillary devices.

Implementations of the systems and methods described herein enable a motor controller to control operations of one or more ancillary devices, in addition to operations of a motor. Accordingly, a consumer wishing to automate devices other than only the motor itself need not purchase and install a separate automation controller. More specifically, the motor controller stores settings and/or parameters, such as time periods and associated motor speeds (i.e., a schedule), and transmits corresponding control signals to the motor to control operations of the motor. Additionally, the motor controller transmits at least one control signal to one of the ancillary devices to control operations of the at least one ancillary device. The ancillary devices include, for example, a heater, a chlorine generator, and/or an ozone generator. In other implementations, the ancillary devices include other devices, for example booster pumps, valves such as a solar valve, an intake valve, and a return valve, sensors, such as water temperature sensors, air temperature sensors, solar temperature sensors, pressure sensors, and flow sensors, and one or more auxiliary devices, such as lights. The ancillary devices may also include a client computing device, a user interface, and/or a building automation controller. In addition to transmitting control signals, the motor controller is configured to receive input signals, including control signals and/or measurement signals (i.e., representing measurements from the one or more sensors). The motor controller may adjust or override a stored schedule for operations of the motor and/or one or more of the ancillary devices, based on an input signal.

In one implementation, a computer program is provided, and the program is embodied on a computer-readable medium. In an example implementation, the computer program is executed on a single computing device, without requiring a connection to a server computer. The computer program is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

FIG. 1 is a block diagram of an example system 100 that includes a motor controller 102 coupled to a motor 104. In some implementations, motor controller 102 is incorporated within motor 104. Motor 104 may be an electric motor and, in some implementations, is an electric variable speed motor, such as an electronically commutated motor (ECM). In other implementations, motor 104 is a single speed or multi-speed motor. Motor 104 drives a pump 106. More specifically, motor 104 is coupled to pump 106 by a shaft 108. Shaft 108 rotates to turn an impeller 110. Pump 106 includes an inlet 112 and an outlet 114. In some implementations, system 100 is used to move liquid, such as water, in a pool, spa, or other aquatic environment. In such implementations, inlet 112 receives the water and outlet 114 expels the received water. In other implementations, motor 104 drives a fan for moving air, for example in a heating, ventilation, and air conditioning (HVAC) system. Motor controller 102 includes a computing device 116 configured to enable motor controller 102 to perform one or more functions described herein. Motor controller 102 is configured to operate motor 104 according to settings stored in a memory 210 (FIG. 2) of computing device 116 and to control operations of one or more ancillary devices 118 that are communicatively coupled (i.e., in signal communication) with motor controller 102.

In this context, ancillary devices 118 are any devices other than pump 106 and motor 104 that pertain to the environment in which motor 104 and pump 106 operate. For example, in a pool or spa environment, ancillary devices 118 may include, for example, a heater, a chlorine generator, an ozone generator, and/or other devices. Ancillary devices 118 are described in more detail herein. The settings may include modes of operation, wherein each mode is associated with a time period and a speed. For example, one mode may be to operate motor 104 at 2100 rotations per minute (RPM) from 1:00 PM to 6:00 PM. In other implementations, the time period is specified as a duration, such as five hours, rather than as an absolute start time and absolute stop time. In some implementations, one or more modes may be based on one or more input signals received, for example, from one or more of ancillary devices 118.

Figure 2:
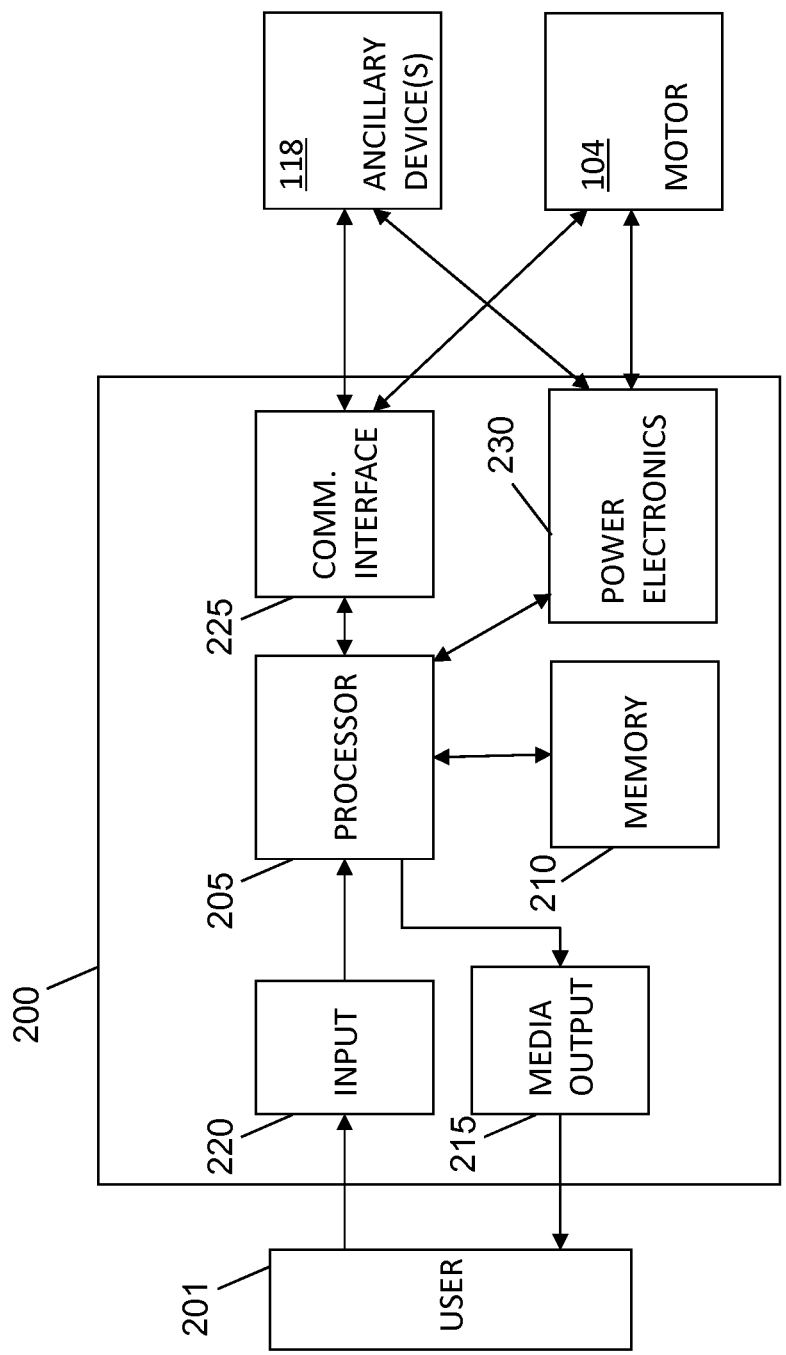
FIG. 2 is a block diagram of an example computing device.

FIG. 2 is a block diagram of an example computing device 200. At least some components of computing device 200 are included in implementations of other devices describe herein, for example computing device 116, client computing device 302, user interface 304, and building automation controller 306. Computing device 200 includes a processor 205 for executing instructions. In some implementations, executable instructions are stored in a memory area 210. Processor 205 may include one or more processing units (e.g., in a multi-core configuration). Memory area 210 is any device allowing information such as executable instructions and/or other data to be stored and retrieved. Memory area 210 stores settings for operating motor 104 and/or ancillary devices 118, as described herein. Memory area 210 may include one or more computer-readable media.

In some implementations, computing device 200 also includes at least one media output component 215 for presenting information to user 201. Media output component 215 is any component capable of conveying information to user 201. In some implementations, media output component 215 includes an output adapter such as a video adapter and/or an audio adapter. An output adapter is operatively coupled to processor 205 and operatively couplable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones). In other implementations, computing device 200 does not include media output component 215. For example, some implementations of computing device 116 (FIG. 1) may not include media output component 215. Rather, in such implementations, media output component 215 may be included in one or more ancillary devices, such as a client computing device 302, a user interface 304, and/or a building automation controller 306 (FIG. 3) in communication with motor controller 102 as described herein.

In some implementations, computing device 200 includes an input device 220 for receiving input from user 201. Input device 220 may include, for example, one or more buttons, a keypad, a touch sensitive panel (e.g., a touch pad or a touch screen), and/or a microphone. A single component such as a touch screen may function as both an output device of media output component 215 and input device 220. Some implementations of computing device 200, for example some implementations of computing device 116 (FIG. 1), do not include input device 220. Rather, in such implementations, input device 220 may be included in one or more ancillary devices, such as a client computing device 302, a user interface 304, and/or a building automation controller 306 (FIG. 3) in communication with motor controller 102 as described herein.

As described above, in some implementations, input device 220 and/or media output component 215 are not included in computing device 200. In such implementations, input and/or output may be transmitted to and/or from one of ancillary device 118 (e.g., a user interface, a client computing device such as a smart phone, and/or an automation controller for a building).

Computing device 200 may also include a communication interface 225, which is communicatively couplable to another device. For example, communication interface 225 may enable communication with one or more of ancillary devices 118 for example through a short range wireless communication protocol such as Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals). Additionally, communication interface 225 may couple motor controller 102 to motor 104. In such implementations, communication interface 225 may include, for example, one or more conductors for transmitting electrical signals and/or power to and/or from motor 104. Additionally, computing device 200 may also include power electronics 230 which may be coupled, for example, to processor 205, motor 104, and one or more of ancillary devices 118.

Figure 3:
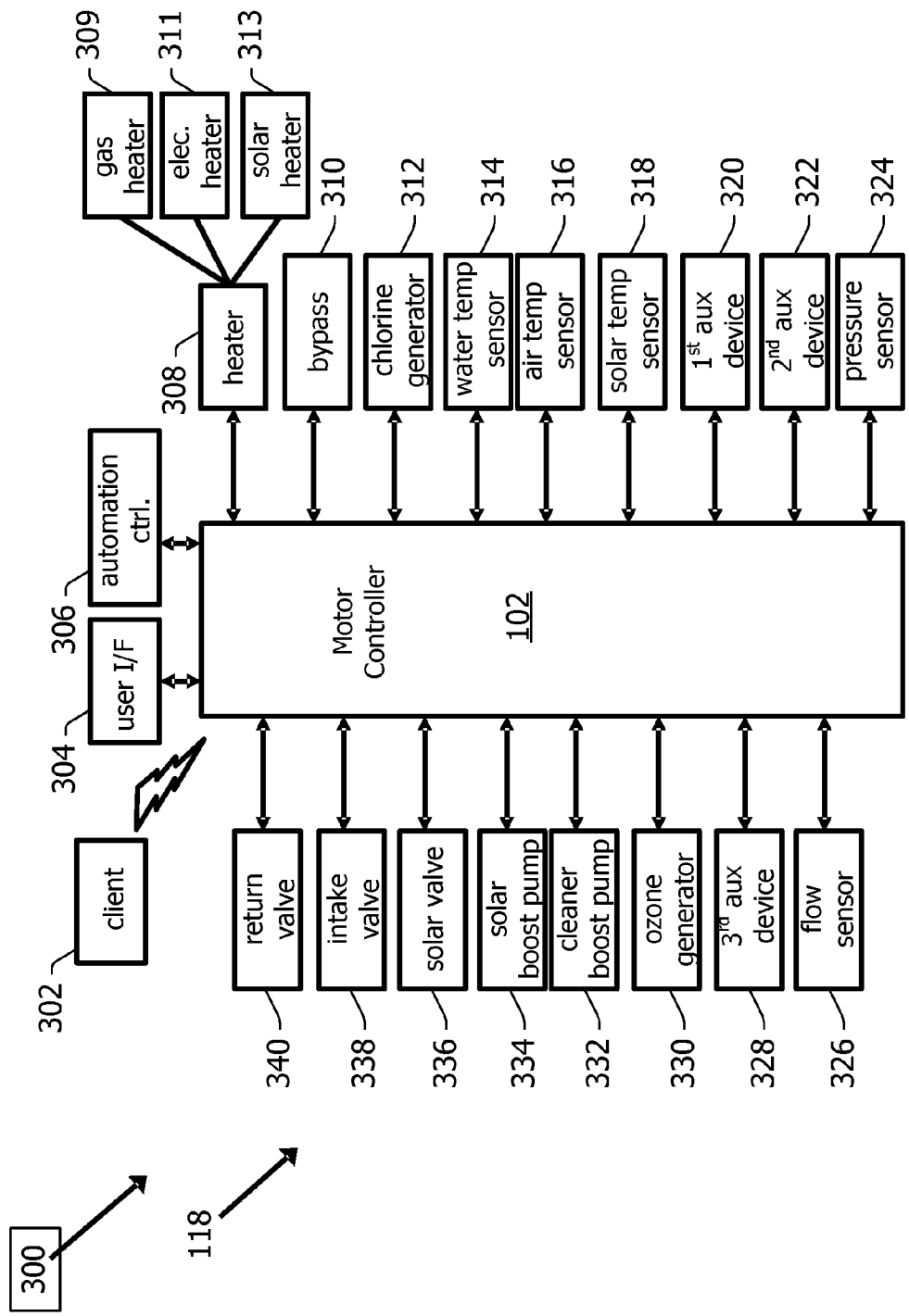
FIG. 3 is a block diagram of a first example network in which the motor controller of FIG. 1 communicates with the ancillary devices.

FIG. 3 is a block diagram of a first example network 300 in which motor controller 102 communicates with ancillary devices 118. Network 300 is a star network, in which motor controller 102 functions as a central hub. Ancillary devices 118 include a client computing device 302, for example a smart phone, a tablet computing device, or a notebook computing device. Ancillary devices 118 additionally include a user interface 304 (i.e., a device that receives and outputs settings, status, and/or other information to user 201), a building automation controller 306, one or more heaters 308, including, for example, a gas heater 309, an electric heater 311, and a solar heater 313. Ancillary devices 118 also include a heater bypass valve 310 that selectively bypasses or directs water through heater 308, a chlorine generator 312, a water temperature sensor 314, an air temperature sensor 316, a solar temperature sensor 318, a first auxiliary device 320, a second auxiliary device 322, a pressure sensor 324, a flow sensor 326, a third auxiliary device 328, an ozone generator 330, a cleaner booster pump 332, a solar booster pump 334, a solar valve 336, an intake valve 338, that selectively directs water to one or more devices (e.g., ancillary devices 118 or pump 106), and a return valve 340 that selectively returns water from one or more devices (e.g., ancillary devices 118 or pump 106).

Motor controller 102 controls ozone generator 330 based on water flow, a speed of motor 104, a duration of operation of motor 104 and/or ozone generator 330, and an amount of ozone generated by ozone generator 330. Motor controller 102 controls chlorine generator 312 based on water flow, a speed of motor 104, a duration of operation of motor 104 and/or chlorine generator 312, and an amount of chlorine generated by chlorine generator 312. Motor controller 102 controls solar booster pump 334 and solar valve 336 to redirect water to solar heater 313 to achieve a temperature setting for the water. Motor controller 102 may selectively transmit a control signal to cleaner booster pump 332 to activate or deactivate cleaner booster pump 332 when motor controller 102 determines that a cleaning mode must begin (i.e., based on the stored schedule and/or from an input signal transmitted from an ancillary device 118). Motor controller 102 may receive measurement signals from flow sensor 326 to perform diagnostics and/or for use in controlling ancillary devices 118 such as ozone generator 330 and chlorine generator 312. Motor controller 102 may receive measurement signals from pressure sensor 324 to regulate water pressure, based on stored settings and to perform diagnostics and fault detection. Motor controller 102 may perform freeze protection based, at least in part, on measurement signals received from air temperature sensor 316. In some implementations, motor controller 102 enables manual control of one or more of ancillary devices 118. Motor controller 102 may enable various operations, for example cleaning and/or backwash operations, to be grouped under one manual action to be initiated at once.

At least one of first auxiliary device 320, second auxiliary device 322, and third auxiliary device 328 may be, for example, pool lights (not shown), a spa jet pump (not shown), or a spa blower (not shown). Motor controller 102 may transmits signals, for example control signals, to one or more ancillary devices 118, and/or receive input signals (e.g., measurement signals and/or control signals) from one or more ancillary devices 118. In network 300, most of ancillary devices 118 are in wired serial communication with motor controller 102. However, client computing device 302 is in wireless communication with motor controller 102. In other implementations, client computing device 302 is in wired serial communication with motor controller 102. In some implementations, motor controller 102 is coupled to one or more ancillary devices 118 through a relatively low-voltage connection (i.e., 24 volts or less) while motor controller 102 is coupled to one or more other ancillary devices through higher-voltage connections (i.e., greater than 24 volts). Connections may be in the form of, for example mechanical contact and/or solid state contact. In some implementations, one or more signals transmitted from motor controller 102 and/or to motor controller 102 are digital signals. In other implementations, one or more signals transmitted from motor controller 102 and/or to motor controller 102 are analog signals.

Figure 4:
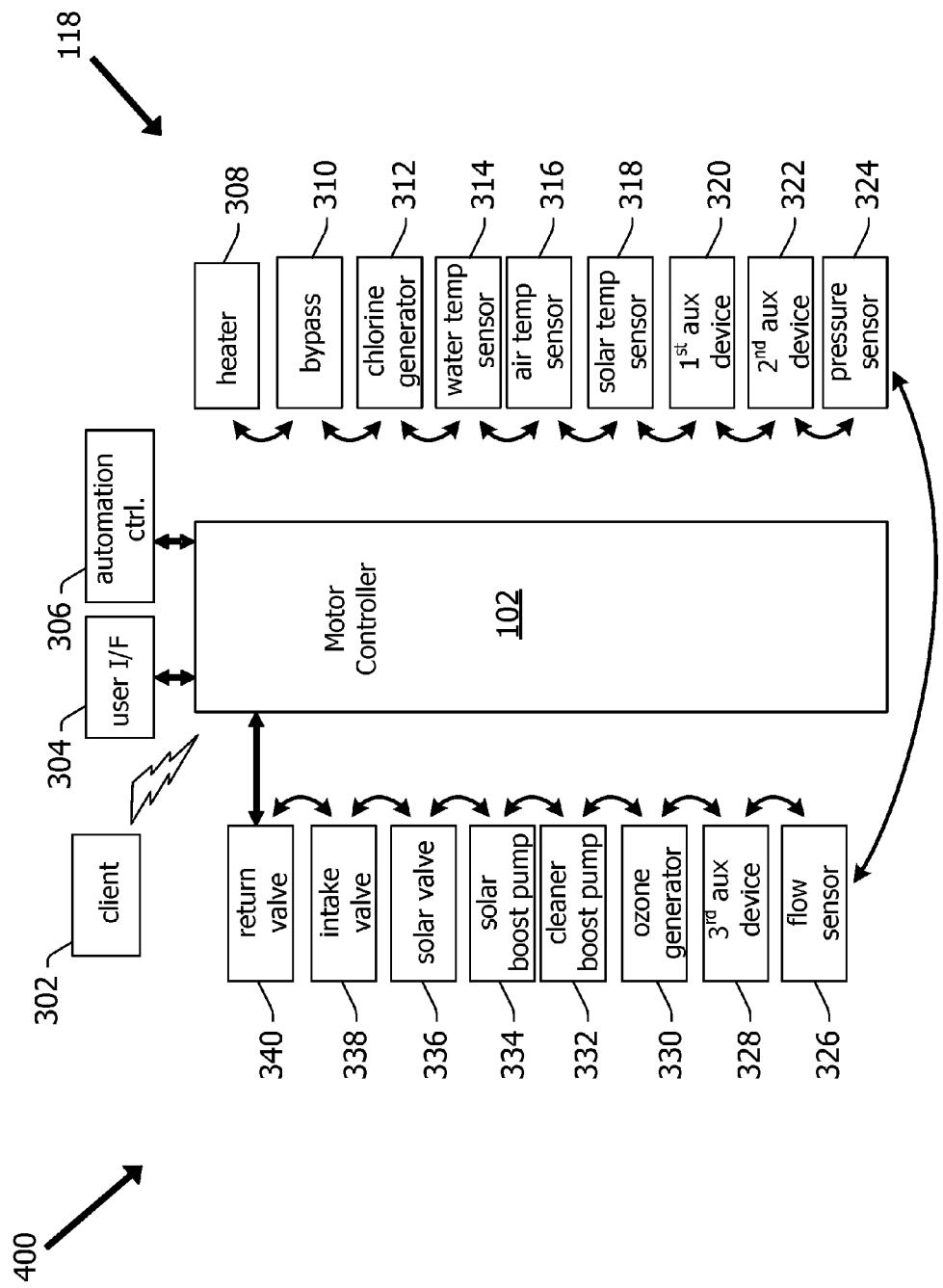
FIG. 4 is a block diagram of a second example network in which the motor controller of FIG. 1 communicates with the ancillary devices.

FIG. 4 is a block diagram of a second example network 400 in which motor controller 102 communicates with ancillary devices 118. In network 400, ancillary devices 118 are in serial communication with motor controller 102 and are daisy-chained together. For example, a control signal transmitted from motor controller 102 to heater 308 passes through ancillary devices 340, 338, 336, 334, 332, 330, 328, 326, 324, 322, 320, 318, 316, 314, 312, and 310 before reaching heater 308. In some implementations, a star network topology (e.g., network 300) may be combined with a daisy chain topology (e.g., network 400), such that multiple ancillary devices 118 are directly coupled to motor controller 102, while other ancillary devices 118 are indirectly coupled to motor controller 102 through daisy chaining.

Figure 5:
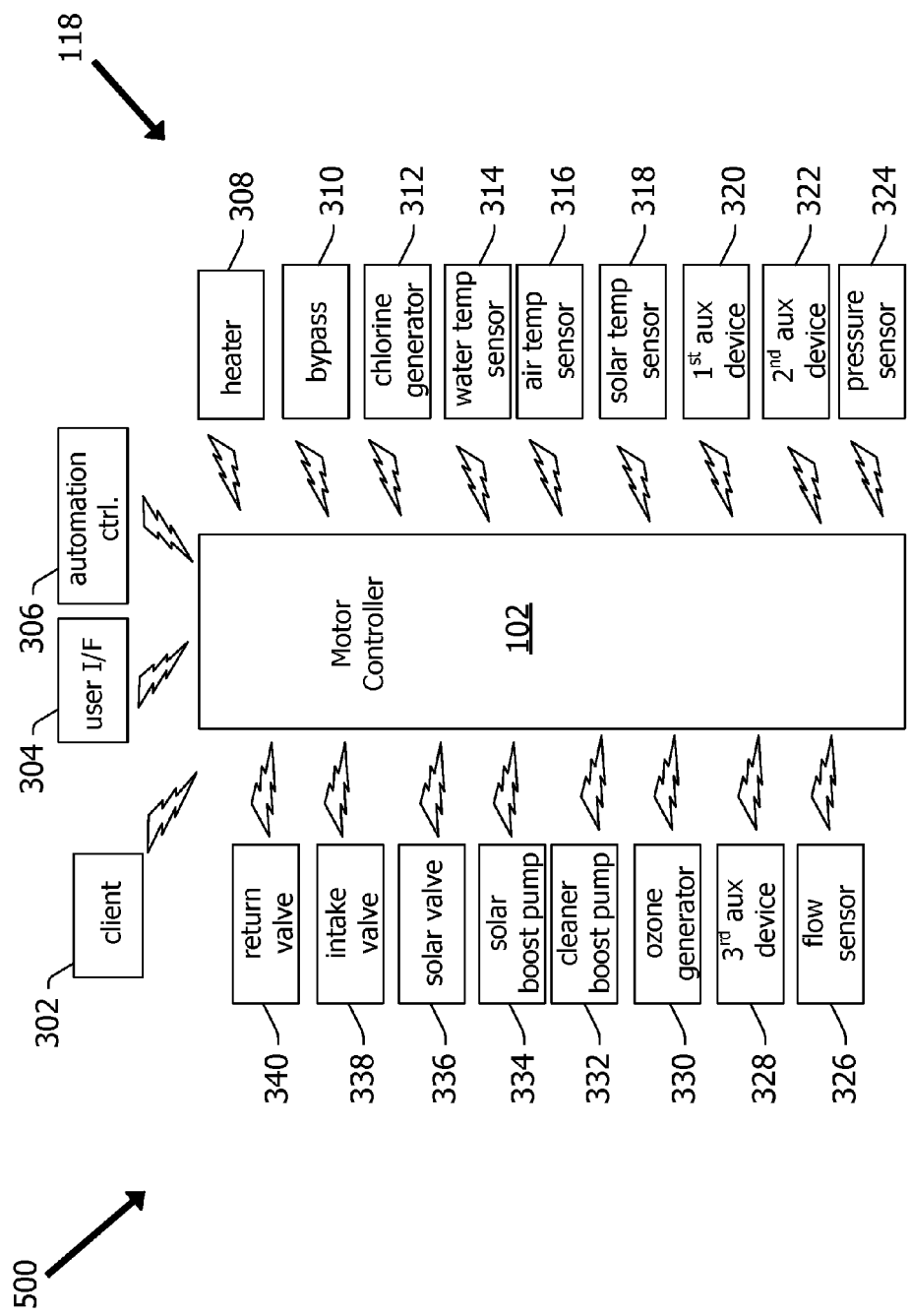
FIG. 5 is a block diagram of a third example network in which the motor controller of FIG. 1 communicates wirelessly with the ancillary devices.
Figure 6:
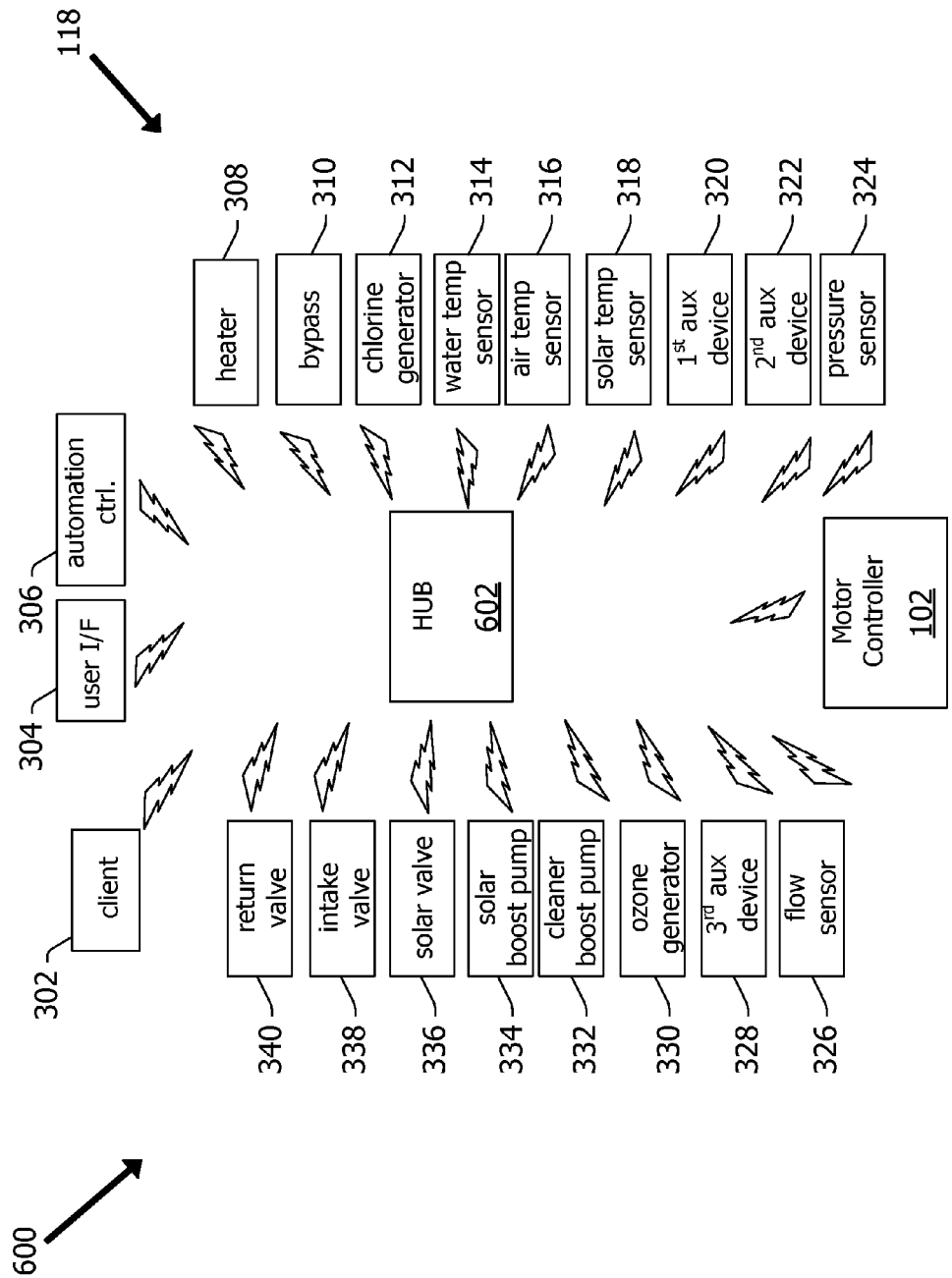
FIG. 6 is a block diagram of a fourth example network in which the motor controller of FIG. 1 communicates wirelessly with the ancillary devices through a hub.

FIG. 5 is a block diagram of a third example network 500 in which motor controller 102 communicates wirelessly with ancillary devices 118. In network 500, motor controller 102 communicates directly with each ancillary device 118. FIG. 6 is a block diagram of a fourth example network 600 in which motor controller 102 communicates wirelessly with ancillary devices 118. Network 600 differs from network 500 in that network 600 includes a hub 602 that receives signals from one or more of ancillary devices 118 and retransmits the signals to ancillary devices 118. Accordingly, in network 600, signals from ancillary devices 118 are not transmitted directly to motor controller 102, and likewise, signals transmitted from motor controller 102 are not directly transmitted to ancillary devices 118. Rather, signals pass through hub 602 before reaching their destination. In some implementations, one or more of ancillary devices 118 or motor controller 102 are wired to hub 602.

Figure 7:
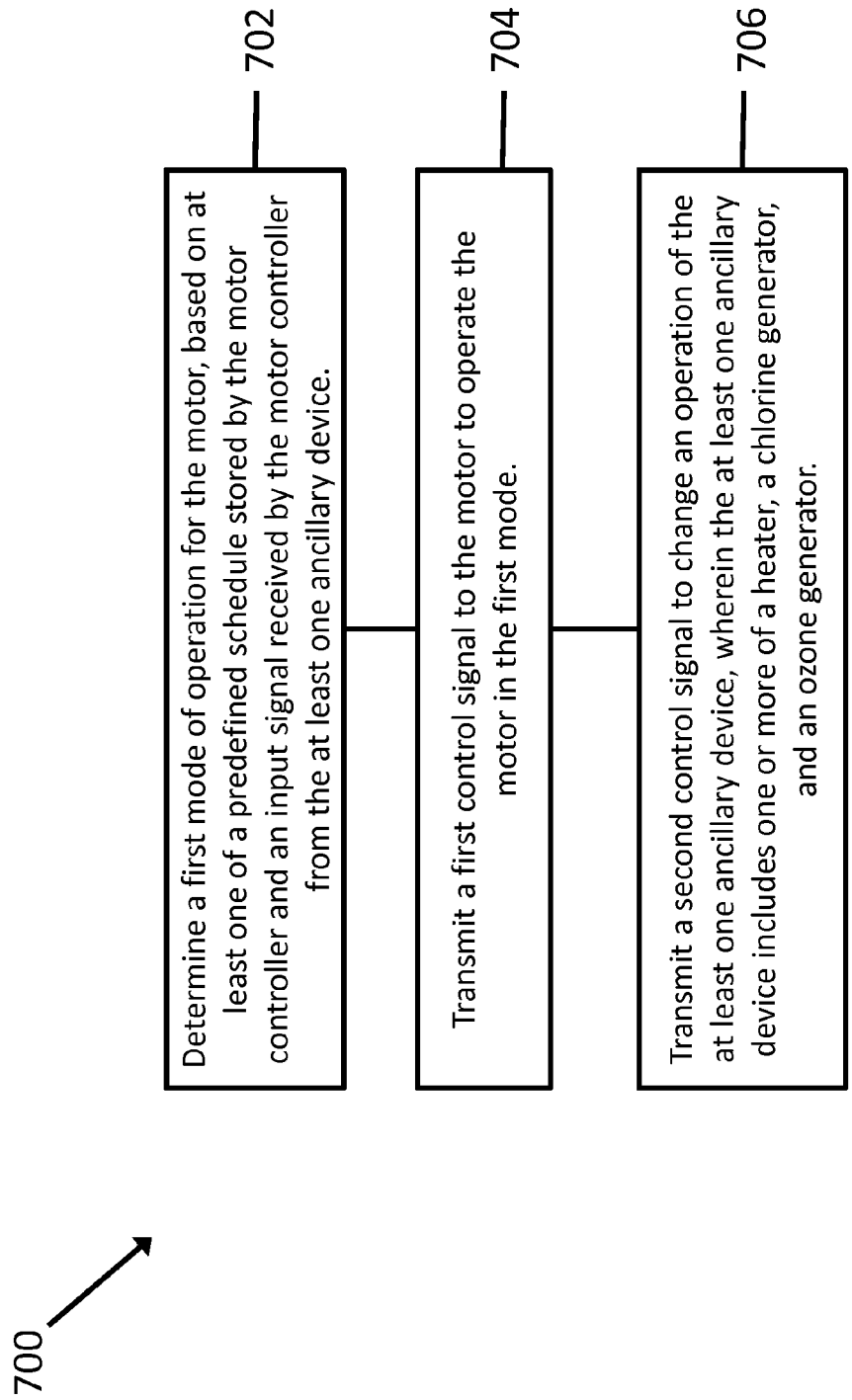
FIG. 7 is a flow chart of an example process performed by the motor controller in accordance with one aspect of the present disclosure.

FIG. 7 is a flow chart of an example process 700 performed by motor controller in accordance with one aspect of the present disclosure. Initially, motor controller 102 determines 702 a first mode of operation for motor 104, based on at least one of a predefined schedule stored by motor controller 102 and an input signal received by motor controller 102 from at least one ancillary device 118. For example, the input signal may be a measurement signal representing a temperature, a pressure, or a flow, or the input signal may be an incoming control signal representing a command or data for use in controlling one or more ancillary devices 118 and/or motor 104. Additionally, motor controller 102 transmits 704 a first control signal to motor 104 to operate motor 104 in the first mode. In implementations in which motor 104 is a single or two-speed motor, the control signal to motor 104 may be, for example, 120 VAC, 230 VAC, or a different value of AC voltage. In implementations in which motor 104 is a variable speed motor, the control signal to motor 104 may be a relatively high voltage pulse width modulated (PWM) signal. Additionally, motor controller 102 transmits 706 a second control signal to change an operation of at least one ancillary device 118, wherein at least one ancillary device 118 includes one or more of a heater (e.g., heater 308), a chlorine generator (e.g., chlorine generator 312), and an ozone generator (e.g., ozone generator 330). For example, motor controller 102 may transmit a control signal (i.e., second control signal) to heater 308 causing heater 308 to heat the water.

In some implementations, motor controller 102 provides schedule-based control, based on pool and spa schedule settings. More specifically, the schedule settings each indicate a time and speed (e.g., mode) for operation of motor 104 and pump 106. More specifically, motor 104 and pump 106 may operate in a first mode having a first time setting and a first speed setting for pumping water in a pool (not shown). Motor 104 and pump 106 may operate in a second mode having a second time setting and a second speed setting for pumping water in a spa (not shown). The times and speeds of the first mode and the second mode are different. Motor controller 102 transmits control signals to intake valve 338 and return valve 340 to receive and return water to and from the pool or spa, based on the corresponding mode.

In some implementations, motor controller 102 transmits at least one of the first control signal and the second control signal with a voltage of at least 24 volts. In some implementations, motor controller 102 transmits at least one of the first control signal and the second control signal with a voltage of at least 120 volts. In some implementations, motor controller 102 receives a measurement signal from at least one of a temperature sensor (e.g., water temperature sensor 314, air temperature sensor 316, and/or solar temperature sensor 318), pressure sensor 324, and flow sensor 326.

In some implementations, motor controller 102 communicatively couples to at least one of client computing device 302, user interface 304, and building automation controller 306. In some implementations, client computing device 302 and/or user interface 304 facilitate configuration, control, and monitoring of motor 104, pump 106, and one or more ancillary devices 118. In some implementations, user interface 304 stores a schedule for various modes of operation of motor 104. In some implementations, an interface circuit (not shown) is coupled between motor controller 102 and building automation controller 306. In some implementations, at least one ancillary device 118 includes a plurality of ancillary devices 118 and motor controller 102 communicates with ancillary devices 118 using serial communication. In some implementations, motor controller 102 communicates wirelessly with at least one ancillary device 118. In some implementations, motor controller 102 selectively operates motor 104 in one of at least the first mode associated with a first time setting and a first speed setting, and the second mode associated with a second time setting and a second speed setting. In some implementations, motor controller 102 additionally operates at least one of intake valve 338 and return valve 340 based on at least one of the first mode and the second mode.

In some implementations, motor controller 102 receives the input signal from at least one ancillary device 118, wherein the input signal indicates a temperature. In such implementations, motor controller 102 additionally determines that the temperature meets a predefined condition and transmits the first control signal to motor 104 based on the determination. In some implementations, at least one ancillary device 118 includes heater 308 and motor controller 102 transmits the second control signal to heater 308 to activate the heater. In other words, in some implementations, motor controller 102 performs temperature-based control. More specifically, motor controller 102 overrides a stored schedule, running pump 106 when a temperature (e.g., a water temperature represented in a measurement signal from water temperature sensor 314) meets a predefined condition (i.e., is equal to or above a predefined threshold, or is less than or equal to a predefined threshold). Motor controller 102 may sample the water temperature by running pump 106 at a programmed interval, speed, and duration while measuring the temperature (i.e., receiving one or more measurement signals from water temperature sensor 314) to determine whether to activate heater 308.

In some implementations, at least one ancillary device 118 includes heater 308 and motor controller 102 receives the input signal from heater 308 and transmits the first control signal to motor 104 based on the received input signal from heater 308. In some implementations, motor controller 102 receives the input signal from heater 308 and delays a scheduled deactivation of motor 104 based on the received input signal from heater 308. In such implementations, motor controller 102 may override the stored schedule based on the input signal from heater 308. In some implementations, motor controller 102 controls heater 308 and once motor controller 102 deactivates heater 308, for example based on the control functions described herein, motor controller 102 causes motor 104 to continue to run to dissipate residual heat in heater 308 and prevent the occurrence of a pounding sound after deactivation.

In some implementations, at least one ancillary device 118 includes heater 308, and motor controller 102 determines that a water temperature has not met a predefined set point. Motor controller 102 causes motor 104 and heater 308 to operate past a predefined deactivation time based on the determination. In some implementations, at least one ancillary device 118 includes a plurality of types of heaters 308, for example gas heater 309, electric heater 311, and solar heater 313. In such implementations, motor controller 102 receives a measurement signal indicating a temperature associated with solar heater 313 and selects one of the plurality of types of heaters (i.e., gas heater 309, electric heater 311, or solar heater 313) for heating the water based at least in part on the temperature associated with solar heater 313. More specifically, motor controller 102 may determine that solar heater 313 is not hot enough to heat the water, and selects a gas heater 309 or electric heater 311 to heat the water.

In some implementations, motor controller 102 provides an interlock input. In such implementations, motor controller 102 is configured to deactivate pump 106 and one or more ancillary devices 118, selected based on stored settings in memory 210, upon receiving an input signal commanding deactivation of pump 106.

The methods and systems described herein may be implemented using computer programming or engineering techniques including computer software, firmware, hardware or any combination or subset thereof, wherein the technical effect may include at least one of: (a) determining a first mode of operation for a motor, based on at least one of a predefined schedule stored by a motor controller and an input signal received by the motor controller from at least one ancillary device; (b) transmitting a first control signal to the motor to operate the motor in the first mode; and (c) transmitting a second control signal to change an operation of the at least one ancillary device, wherein the at least one ancillary device includes one or more of a heater, a chlorine generator, and an ozone generator.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

As compared to known systems and methods that use a standalone automation controller for automating operations of a pump motor and ancillary devices in an aquatic environment, the systems and methods described herein enable a motor controller to automate operations of the pump motor and ancillary devices. Accordingly, the added cost and space required for a standalone automation controller may be eliminated.

Exemplary embodiments of systems and methods for automating one or more devices using a motor controller for a pump are described herein. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller integrated in a pump motor configured to drive a pump, said motor controller configured to:
   determine a first mode of operation for the pump motor, based on at least one of a predefined schedule stored by the motor controller and an input signal received by the motor controller from at least one ancillary device, the at least one ancillary device pertaining to an environment in which the pump motor and pump operate;
   transmit a first control signal to the pump motor to operate the pump motor in the first mode;
   determine a mode of operation for the at least one ancillary device based on the input signal received from the at least one ancillary device, wherein the at least one ancillary device includes one or more of a heater, a chlorine generator, and an ozone generator; and
   transmit a second control signal wirelessly to the at least one ancillary device to change the mode of operation of the at least one ancillary device.

2. The motor controller of claim 1, further configured to transmit at least one of the first control signal and the second control signal with a voltage of at least 24 volts.

3. The motor controller of claim 1, further configured to transmit at least one of the first control signal and the second control signal with a voltage of at least 120 volts.

4. The motor controller of claim 1, further configured to receive a measurement signal from at least one of a temperature sensor, a pressure sensor, and a flow sensor.

5. The motor controller of claim 1, further configured to communicatively couple to at least one of a user interface, a client computing device, and a building automation system.

6. The motor controller of claim 1, wherein the at least one ancillary device is a plurality of ancillary devices and said motor controller is further configured to communicate with the plurality of ancillary devices using serial communication.

7. The motor controller of claim 1, further configured to communicate wirelessly with the at least one ancillary device.

8. The motor controller of claim 1, further configured to selectively operate the motor in one of at least the first mode associated with a first time setting and a first speed setting, and a second mode associated with a second time setting and a second speed setting, and to operate at least one of an intake valve and a return valve based on at least one of the first mode and the second mode.

9. The motor controller of claim 1, further configured to:
   receive the input signal from the at least one ancillary device, wherein the input signal indicates a temperature;
   determine that the temperature meets a predefined condition; and
   transmit the first control signal to the motor based on the determination.

10. The motor controller of claim 9, wherein the at least one ancillary device includes a heater, and wherein said motor controller is further configured to transmit the second control signal to the heater to activate the heater.

11. The motor controller of claim 1, wherein the at least one ancillary device includes a heater, and wherein said motor controller is further configured to:
    receive the input signal from the heater; and transmit the first control signal to the motor based on the received input signal from the heater.

12. The motor controller of claim 1, wherein the at least one ancillary device includes a heater, and wherein said motor controller is further configured to:
receive the input signal from the heater; and
delay a scheduled deactivation of the motor based on the received input signal from the heater.

13. The motor controller of claim 1, wherein the at least one ancillary device includes a heater, and said motor controller is further configured to:
determine that a water temperature has not met a predefined set point; and
cause the motor and the heater to operate past a predefined deactivation time based on the determination.

14. The motor controller of claim 1, wherein the at least one ancillary device includes a plurality of types of heaters, including a solar heater, and said motor controller is further configured to:
receive a measurement signal indicating a temperature associated with the solar heater; and
select one of the plurality of types of heaters for heating water based at least in part on the temperature associated with the solar heater.

15. The motor controller of claim 1, wherein transmitting the second control signal further comprises transmitting the second control signal to the at least one ancillary device.

16. A system comprising:
a pump;
a pump motor coupled to and configured to drive said pump;
a motor controller integrated in said pump motor; and
at least one ancillary device communicatively coupled to said motor controller, said at least one ancillary device pertaining to an environment in which said pump motor and pump operate, wherein said at least one ancillary device includes at least one of a heater, a chlorine generator, and an ozone generator,
wherein said motor controller is configured to:
determine a first mode of operation for said pump motor, based on at least one of a predefined schedule stored by said motor controller and an input signal received by said motor controller from said at least one ancillary device;
transmit a first control signal to said pump motor to operate said pump motor in the first mode;
determine a mode of operation for said at least one ancillary device based on the input signal received from the at least one ancillary device; and
transmit a second control signal wirelessly to said at least one ancillary device to change the mode of operation of said at least one ancillary device.

17. The system of claim 16, wherein said at least one ancillary device is a plurality of ancillary devices and said motor controller is further configured to communicate with said plurality of ancillary devices using serial communication.

18. The system of claim 17, wherein said motor controller and said plurality of ancillary devices are arranged in a star network and said motor controller is configured to operate as a central hub of said star network.

19. The system of claim 17, wherein said motor controller and said plurality of ancillary devices are arranged in a daisy chain network.

20. A method for automating operations of an ancillary device with a motor controller integrated in a pump motor configured to drive a pump, said method comprising:
determining, by the motor controller, a first mode of operation for the pump motor, based on at least one of a predefined schedule stored by the motor controller and an input signal received by the motor controller from the at least one ancillary device, the at least one ancillary device pertaining to an environment in which the pump motor and pump operate;
transmitting, by the motor controller, a first control signal to the pump motor to operate the pump motor in the first mode;
determining, by the motor controller, a mode of operation for the at least one ancillary device based on the input signal received from the at least one ancillary device, wherein the at least one ancillary device includes one or more of a heater, a chlorine generator, and an ozone generator; and
transmitting, by the motor controller, a second control signal wirelessly to the at least one ancillary device to change the mode of operation of the at least one ancillary device.

* * * * *